(12) United States Patent
Kaibuki

(10) Patent No.: US 7,058,746 B1
(45) Date of Patent: Jun. 6, 2006

(54) ELECTRONIC DEVICE HAVING DATA PROCESSING SUBUNIT WITH FUNCTIONAL BLOCK TERMINATION DEVICE

(75) Inventor: Futoshi Kaibuki, Tokyo (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 09/661,223

(22) Filed: Sep. 13, 2000

(30) Foreign Application Priority Data

Sep. 14, 1999 (JP) .................................. 11-261233

(51) Int. Cl.
*G06F 13/14* (2006.01)
(52) U.S. Cl. ....................................... 710/305; 710/306
(58) Field of Classification Search ........ 710/305–306, 710/315, 104, 100, 106; 370/463, 468, 489–490; 709/228, 250; 455/3.02
See application file for complete search history.

(56) References Cited

U.S. PATENT DOCUMENTS

| 5,923,673 | A | * | 7/1999 | Henrikson ................... 714/712 |
| 6,141,702 | A | * | 10/2000 | Ludtke et al. ................. 710/5 |
| 6,370,198 | B1 | * | 4/2002 | Washino ................. 375/240.26 |
| 6,504,996 | B1 | * | 1/2003 | Na et al. ..................... 386/125 |
| 6,577,337 | B1 | * | 6/2003 | Kang ....................... 348/207.1 |
| 2001/0043731 | A1 | * | 11/2001 | Ito et al. ....................... 382/132 |
| 2003/0210252 | A1 | * | 11/2003 | Ludtke et al. .............. 345/629 |
| 2005/0097245 | A1 | * | 5/2005 | Lym et al. ..................... 710/52 |

FOREIGN PATENT DOCUMENTS

| EP | 0 835 029 | 4/1998 |
| EP | 0 843 482 | 5/1998 |
| EP | 0 848 568 | 6/1998 |

* cited by examiner

*Primary Examiner*—Rehana Perveen
*Assistant Examiner*—Kim T. Huynh
(74) *Attorney, Agent, or Firm*—Finnegan, Henderson, Farabow, Garrett & Dunner, L.L.P.

(57) ABSTRACT

An electronic device includes a subunit (e.g., monitor) for receiving and processing input data. The subunit includes one or more functional blocks, with at least one functional block operative as a termination device such as a display, printer or audio speaker to terminate (e.g., transform and output) the processed input data of the subunit. The electronic device further includes a memory for storing information pertaining to the termination device. Preferably, the electronic device is configured to communicate with other devices in a serial bus connected system employing channels for time division multiplexed communication. The information pertaining to the termination device stored in the memory preferably includes "virtual plug" information for the termination device, indicating, for example, the number of logical connections that the termination device can maintain. The memory is accessible by an external apparatus to thereby enable the external apparatus to readily obtain the logical connection state of the termination device and facilitate operations.

14 Claims, 14 Drawing Sheets

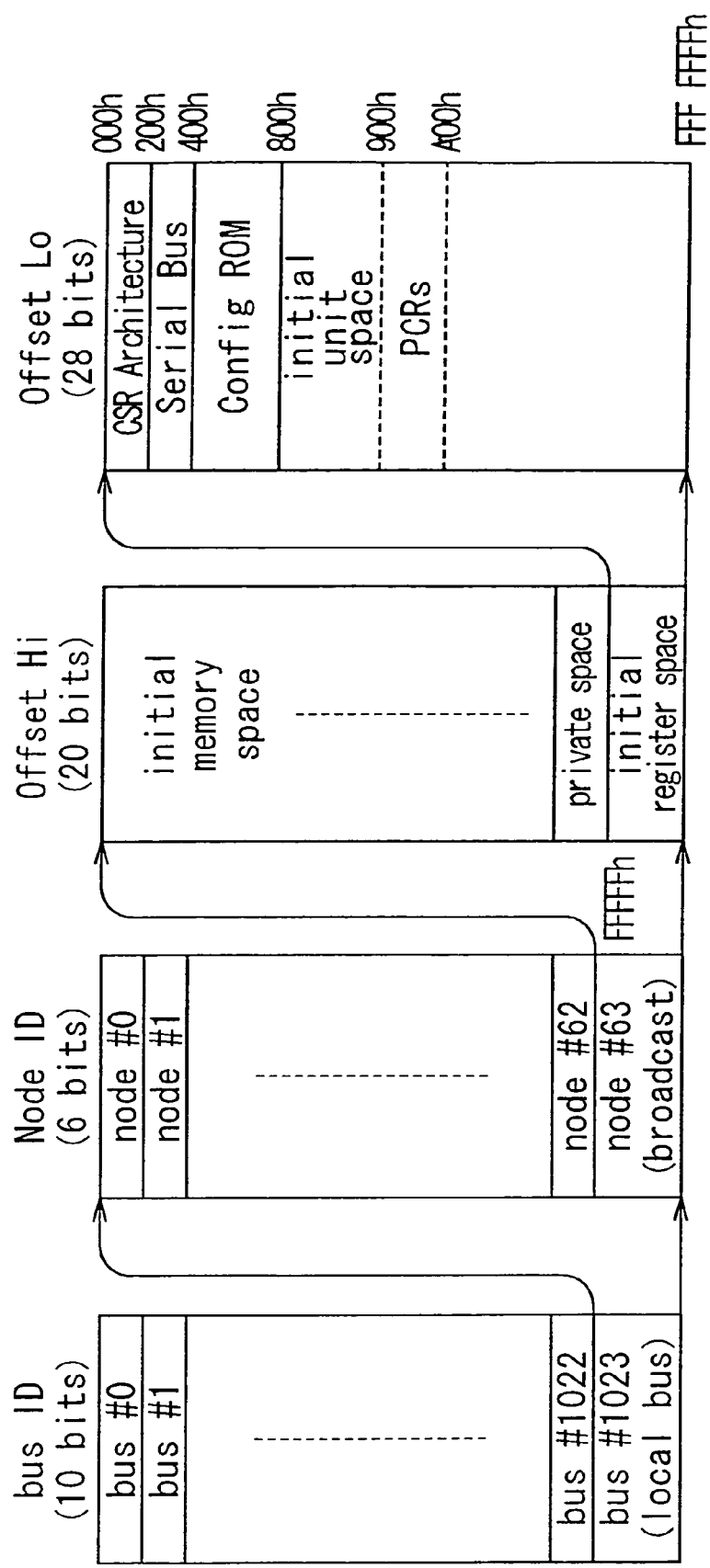

FIG. 4

| OFFSETS | NAMES | FUNCTIONS |
|---|---|---|
| 000h | STATE_CLEAR | STATE AND CONTROL INFORMATION |
| 004h | STATE_SET | SET STATE_CLEAR BIT |
| 008h | NODE_IDs | INDICATE 16-BIT NODE ID |
| 00Ch | RESET_START | START COMMAND RESET |
| 018h-01Ch | SPLIT_TIMEOUT | PRESCRIBE MAXIMUM TIME OF SPLIT |
| 200h | CYCLE_TIME | CYCLE TIME |
| 210h | BUSY_TIMEOUT | PRESCRIBE LIMIT OF RETRY |
| 21Ch | BUS_MANAGER | INDICATE BUS MANAGER ID |
| 220h | BANDWIDTH_AVAILABLE | INDICATE BANDWIDTH THAT CAN BE ASSIGNED TO ISOCHRONOUS COMMUNICATION |
| 224h-228h | CHANNELS_AVAILABLE | INDICATE USED STATE OF EACH CHANNEL |

F I G. 5
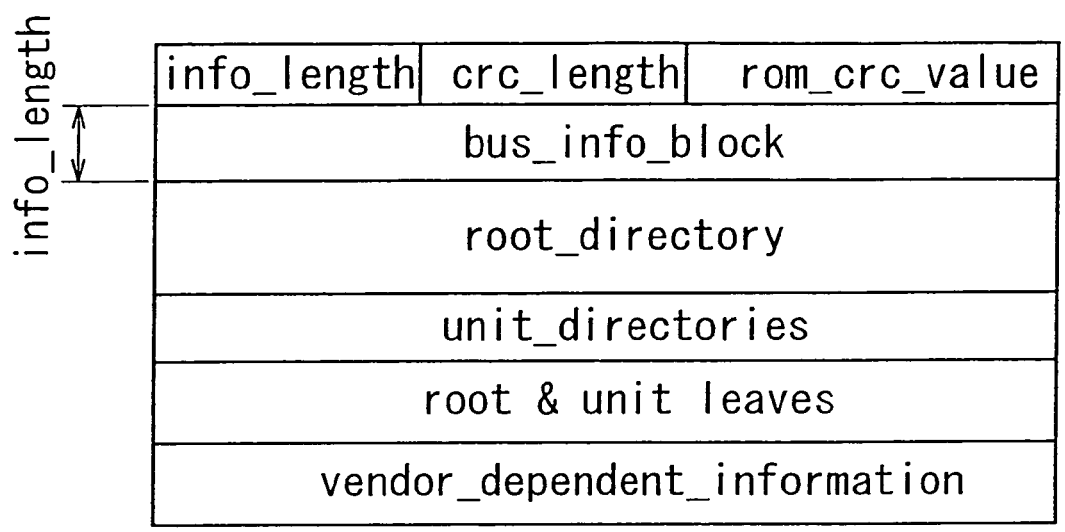

FIG. 6

| | | | |
|---|---|---|---|
| 400h | 04h | crc_length | rom_crc_value |

Bus_info_block

| | |
|---|---|
| 404h | "1394" |
| 408h | imc / crc / isc / bmc / reserved / cyc_clk_acc / max_rec / reserved |
| 40Ch | Company_ID / Chip_ID_hi |
| 410h | Chip_ID_lo |

Root_directory

| | | |
|---|---|---|
| 414h | root_length | CRC |
| 418h | 03h | module_vendor_id |
| 41Ch | 0Ch | node_capabilities |
| 420h | 8Dh | node_unique_id offset |
| 424h | D1h | unit_directory_offset |
| 428h | | Optional. |

Unit_directory

| | | |
|---|---|---|
| | unit_directory_length | CRC |
| | 12h | unit_spec_id |
| | 13h | unit_sw_version |
| | | Optional. |

FIG. 7

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 8

(A) oMPR

| data rate capability | broadcast channel base | non-persistent extension field | persistent extension field | reserved | number of output plugs |
|---|---|---|---|---|---|
| 2 | 6 | 8 | 8 | 3 | 5 (bit) |

(B) oPCR[n]

| on-line | broadcast connection counter | point-to-point connection counter | reserved | channel number | data rate | overhead ID | payload |
|---|---|---|---|---|---|---|---|
| 1 | 6 | 6 | 2 | 6 | 2 | 4 | 10 (bit) |

(C) iMPR

| data rate capability | reserved | non-persistent extension field | persistent extension field | reserved | number of output plugs |
|---|---|---|---|---|---|
| 2 | 6 | 8 | 8 | 3 | 5 (bit) |

(D) iPCR[n]

| on-line | broadcast connection counter | point-to-point connection counter | reserved | channel number | reserved |
|---|---|---|---|---|---|
| 1 | 6 | 6 | 2 | 6 | 16 (bit) |

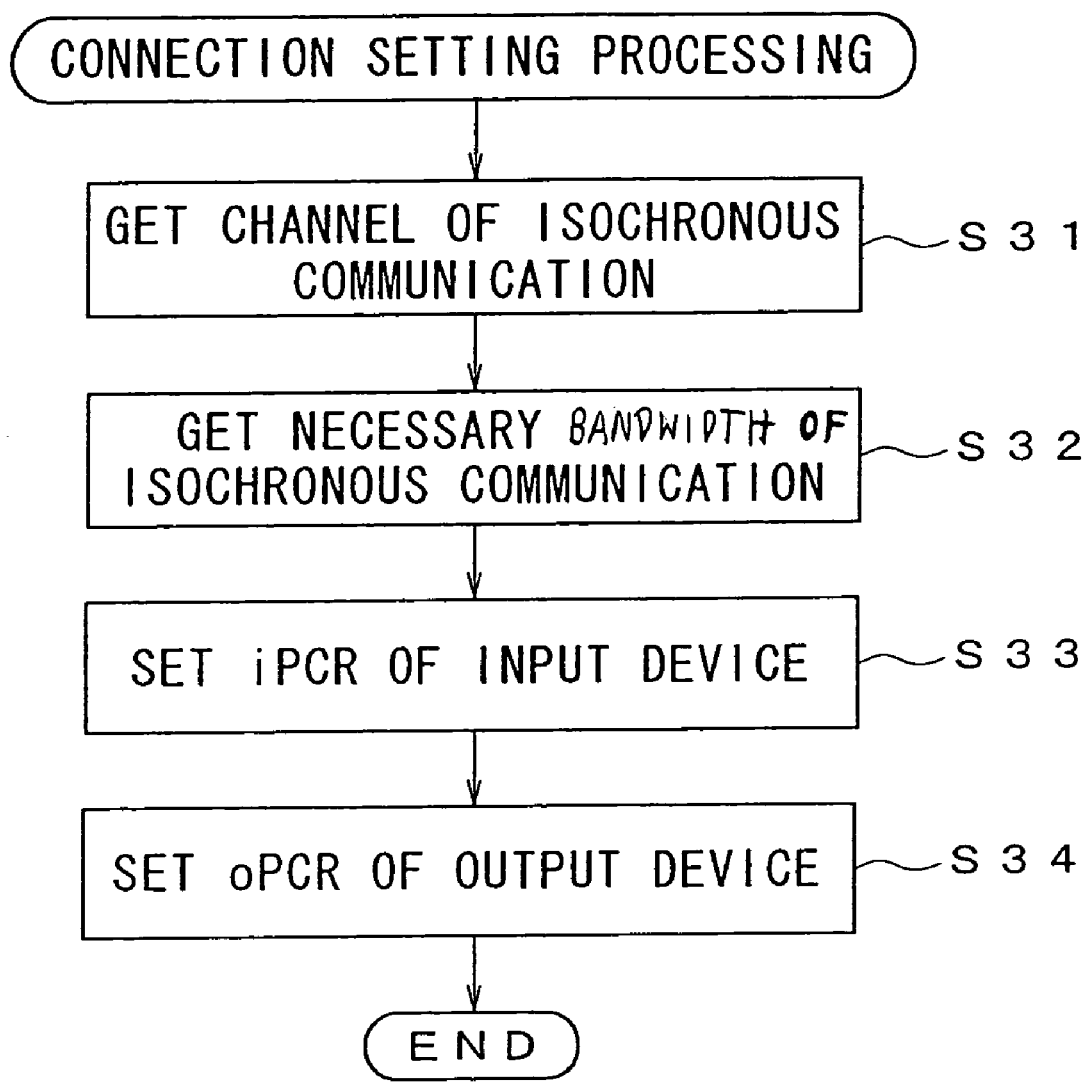

FIG. 12

| Monitor Subunit dependent information ||
|---|---|
| Address offset | Contents |
| 0000₁₆ | Subunit_dependent_length=33bytes |
| 0001₁₆ | |
| | Datastructure_type=Monitor subunit dependent information |
| | Audio_subunit_version=FF(hex) |
| | Monitor_subunit_version=10(hex) |
| | Number_of_configuration_dependent_information=1 |
| | Configuration_dependent_length=26bytes |
| | Datastructure_type=Configuration_Information |
| | Config_ID=1 |
| | Master_cluster_information |
| | Number_of_source_plug=0 |
| | number_of_fb_dependent_information=2 |
| | fb_dependent_length=10bytes |
| | Datastructure_type=FB_dependent_information |
| | fb_type=video_feature |
| | fb_ID=1 |
| | fb_name=FF |
| | number_of_destination_plug=1 |
| | Source_ID(1)=subunit destination plug 1 |
| | cluster_information=same as up stream |
| | fb_dependent_length=10bytes |
| | Datastructure_type=FB_dependent_information |
| | fb_type=display |
| | fb_ID=2 |
| | fb_name=FF |
| | number_of_destination_plug=1 |
| | Source_ID(1)=fb_type;video feature, fb_ID;1 |
| | cluster_information=none |

FIG. 14 (RELATED ART)

| Monitor Subunit dependent information | |
|---|---|
| Address offset | Contents |
| 000016 | Subunit_dependent_length=25bytes |
| 000116 | Datastructure_type=Monitor subunit dependent information |
| | Audio_subunit_version=FF(hex) |
| | Monitor_subunit_version=10(hex) |
| | Number_of_configuration_dependent_information=1 |
| | Configuration_dependent_length=19bytes |
| | |
| | Datastructure_type=Configuration_Information |
| | Config_ID=1 |
| | Master_cluster_information |
| | Number_of_source_plug=0 |
| | Number_of_fb_dependent_information=1 |
| | fb_dependent_length=10bytes |
| | |
| | Datastructure_type=FB_dependent_information |
| | fb_type=video_feature |
| | fb_ID=1 |
| | fb_name=FF |
| | Number_of_destination_plug=1 |
| | Source_ID(1)=subunit destination plug 1 |
| | cluster_information=same as up stream |

ELECTRONIC DEVICE HAVING DATA PROCESSING SUBUNIT WITH FUNCTIONAL BLOCK TERMINATION DEVICE

BACKGROUND OF THE INVENTION

1. Technical Field

This invention relates to an electronic device for use with, for example, a digital television receiver or the like. More particularly, the invention relates to an electronic device configured to perform data communication with other devices over a serial data bus.

2. Description of the Related Art

Digital television receivers have recently been proposed which allow for data communication in accordance with the IEEE-1394-1995 high performance serial bus system. The IEEE-1394-1995 standard, promulgated in 1995, provides a universal protocol for data communications over a serial bus. This standard defines a digital interface for data communications, thereby eliminating the need for an application to convert digital data to analog data before it is transmitted across the bus. Likewise, a receiving application will receive digital data from the bus rather than analog data, and will therefore not be required to perform A/D conversion.

The IEEE 1394 standard has been adopted to implement an inexpensive high-speed architecture that supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. Multiple channels are provided for isochronous data transfer between applications. A six bit channel number is broadcast with the data to ensure reception by the appropriate device. This allows multiple devices to transmit isochronous data across the bus structure. Asynchronous transfers are traditional data transfer operations which take place as soon as possible and transfer an amount of data from a source to a destination.

Referring to FIG. 13, by way of example, a digital television receiver (hereinafter referred to as "DTV") 100 serving as an IEEE 1394 node may include subunits such as a tuner 110 and a monitor 120. Monitor 120 includes a video processing section 120A for performing signal processing on inputted video data, such as adjustment of brightness and adjustment of chromaticity; and a display 120B for displaying an image based on the video data that has been signal-processed by video processing section 120A. The display 120B is considered a functional block (termination device) which transforms and "terminates" inputted video data. (Data is considered to be "terminated" when it is used by an end device, such as a display that transforms input data to a displayed image.)

DTV 100 also includes a memory 130 that stores information pertaining to the above-mentioned subunits existing within DTV 100. For example, when monitor 120 is connected to an external electronic device, as indicated in FIG. 13, a plug 120P of monitor 120 interconnected to video processing section 120A is interconnected to a plug 100P of the DTV 100 which is interconnected to the external electronic device.

FIG. 14 shows an example of a related art descriptor having information pertaining to the monitor 120 stored in the above-mentioned memory 130. The stored information enables an external device to readily ascertain, among other things, the logical connection state of video processing section 120A, thereby facilitating data communication with DTV 100.

While the above example illustrates the utility of serial bus connected devices, there is a continuing need to provide ways to facilitate data communication among such devices and improve operability of serial data bus connected systems. The present invention addresses this need.

SUMMARY OF THE INVENTION

It is an object of the present invention to provide an electronic device including a functional block that terminates processed data, in which the interconnected state of the functional block can be readily obtained by an external apparatus, e.g., a controller.

It is a further object of the invention to improve operability of a data communication system in which multiple electronic devices are interconnected via a serial data bus.

In accordance with an illustrative embodiment of the invention, there is provided an electronic device having a subunit (e.g., monitor) for receiving and processing input data. The subunit includes one or more functional blocks, with at least one functional block operative as a termination device such as a display, printer or speaker to terminate (e.g., transform and output) the processed input data of the subunit. The electronic device further includes a memory for storing information pertaining to the termination device.

Preferably, the electronic device is configured to communicate with other devices in a serial bus connected system employing channels for time division multiplexed communication. The information pertaining to the termination device stored in the memory preferably includes "virtual plug" information for the termination device, indicating, for example, the number of logical connections the termination device is capable of simultaneously maintaining. The memory is accessible by an external apparatus to thereby enable the external apparatus to readily obtain the logical connection state of the termination device and facilitate operations.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements or parts, wherein:

FIG. 3 is a diagram illustrating an address space structure of a Control & Status Register (CSR) architecture;

FIG. 4 illustrates positions, names and functions of major CSRs;

FIG. 5 is a diagram illustrating a general ROM format;

FIG. 6 is a diagram showing details of a bus info block, a root directory and a unit directory;

FIG. 7 illustrates an arrangement of a Plug Control Register (PCR);

FIG. 8 is a diagram depicting arrangements of oMPR, oPCR, iMPR and iPCR;

FIG. 11 is a flowchart illustrating a connection setting procedure in the isochronous transmission;

FIG. 12 is a diagram showing a structure of a descriptor having monitor information in accordance with the invention;

FIG. 14 is a diagram showing a related art structure of a descriptor having monitor information.

DETAILED DESCRIPTION OF PREFERRED EMBODIMENTS

A preferred embodiment of the present invention will now be described in the context of an IEEE-1394-1995 serial bus system. It is understood, however, that this application is merely exemplary, and that the invention is contemplated for use in other types of data communication systems as well.

Figure 1:
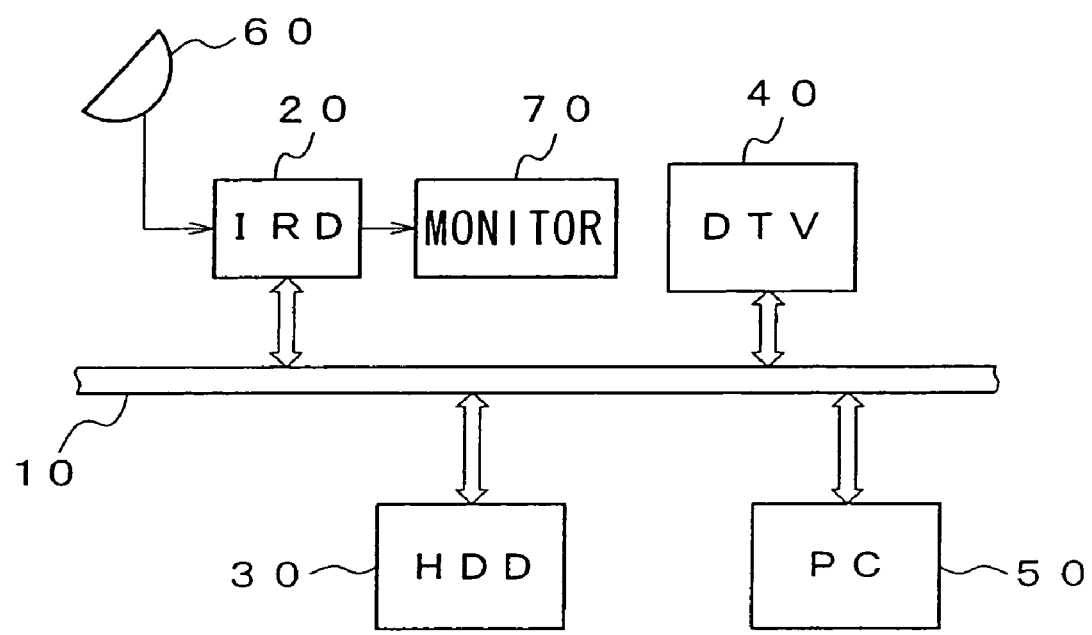
FIG. 1 is a block diagram of a network system interconnected by an IEEE 1394 bus.

FIG. 1 depicts a network system embodying the present invention, in which a plurality of nodes are interconnected by an IEEE 1394-1995 serial bus. (Hereafter, "IEEE-1394" will be used to refer to the IEEE-1394-1995 Standard for a High Performance Serial Bus.) In the illustrated system, an IEEE 1394 bus 10 is interconnected with an Integrated Receiver Decoder (IRD) 20 serving as a digital satellite broadcast receiver, a hard disk drive (HDD) 30, a digital television receiver (DTV) 40 and a personal computer (PC) 50. IRD 20, HDD 30, DTV 40 and PC 50 may be each be configured as IEEE 1394 nodes. IRD 20 is also connected to a reception antenna 60 and a monitor 70.

Figure 2:
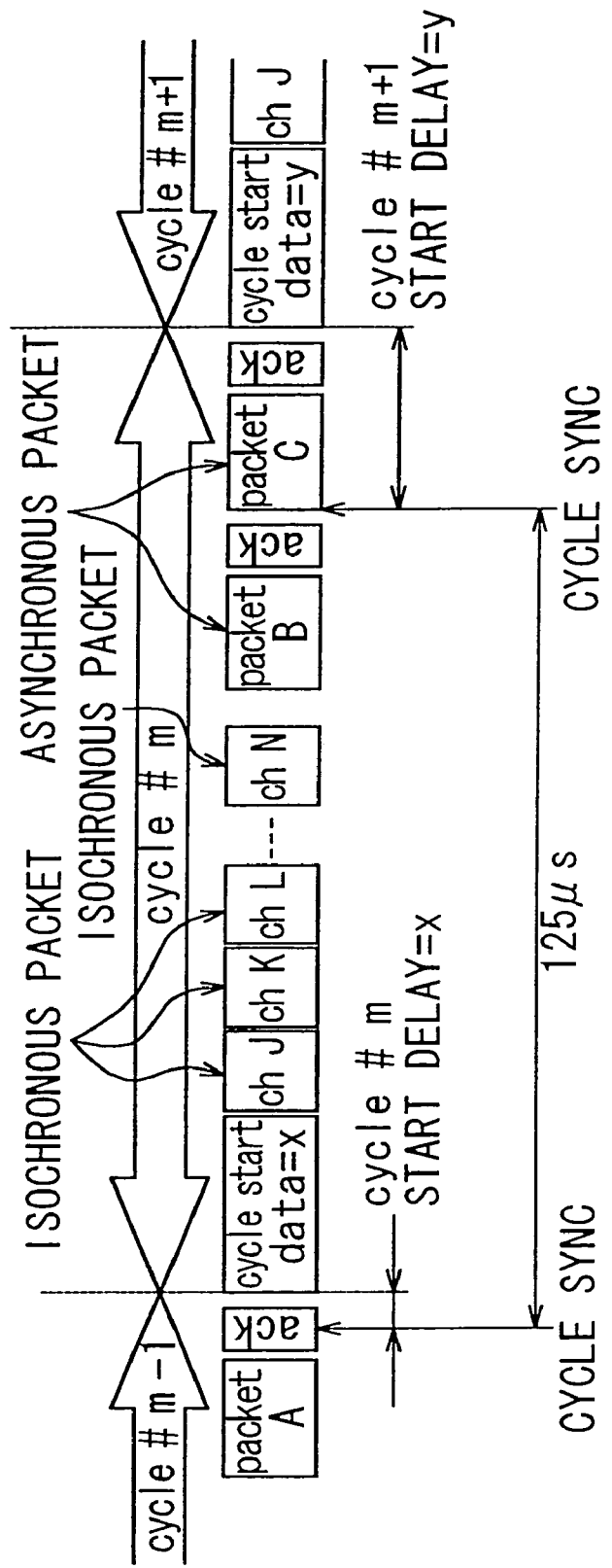
FIG. 2 is a diagram showing a data transmission cycle structure of a device interconnected by an IEEE 1394 bus.

With reference to FIG. 2, a data transmission cycle format of a device operating in accordance with the IEEE 1394 system is shown. According to the IEEE 1394 standard, data is divided into packets and transmitted in a time-division manner based on a cycle of duration of 125 µs. This cycle may be created by a cycle start signal supplied from a node (e.g., any one of the devices shown in FIG. 1) having a cycle master function.

An isochronous packet maintains a bandwidth suitable for transmission from the start of all cycles. ("Bandwidth", as used herein and in the IEEE-1394 standard, signifies the duration of a repetitive time slot(s), rather than frequency span as in the conventional sense.) Therefore, the isochronous transmission guarantees the transmission of data during a constant time interval. However, when a transmission error occurs, no mechanism is provided for protecting data from the transmission error, resulting in possible loss of data.

During a time which is not used in the isochronous transmission of each cycle, the node that has maintained the bus as a result of arbitration may transmit an asynchronous packet. In the asynchronous transmission, although a reliable transmission may be guaranteed by using acknowledge and retry, the transmission timing may not always be constant.

In order for a predetermined node to execute the isochronous transmission, the node should correspond to the isochronous function. Moreover, at least one of the nodes corresponding to the isochronous function should have a cycle master function. Further, one of the nodes interconnected to the IEEE 1394 bus 10 should have an isochronous resource manager function.

The IEEE 1394-1995 standard is based on the Control & Status Register (CSR) architecture having a 64-bit address space prescribed by the ISO/IEC 13213 standard. FIG. 3 is a diagram illustrating the structure of the address space of the CSR architecture. The upper 16 bits may be node IDs indicative of nodes in the IEEE 1394 based system, and the remaining 48 bits may be used to designate the address space assigned to each node. The upper 16 bits may further be divided into 10 bits of bus ID and 6 bits of physical ID (node ID in a narrow sense). Since values in which all bits are set to 1 may be used in a special condition, 1023 buses and 63 nodes can be designated.

Of the 256-terabyte address space prescribed by the lower 48 bits, the space prescribed by the upper 20 bits may be divided, as shown in FIG. 3, into: an initial register space for use in a register peculiar to 2048-byte CSR, a register peculiar to IEEE 1394 or the like; a private space; and an initial memory space and the like. The space prescribed by the lower 28 bits may be used as a configuration ROM, an initial unit space employed in a use peculiar to the node, a plug control register (PCR) and the like if the space prescribed by the upper 20 bits is the initial register space.

FIG. 4 is a diagram useful in explaining offset addresses, names and functions of major CSRs. The "offsets" column in FIG. 4 indicates the offset from FFFFF0000000h (numerals affixed with h express a hexadecimal notation) at which the initial register space starts. A bandwidth available register ("Bandwidth_Available") having an offset 220h indicates a bandwidth that can be assigned to the isochronous communication. Only a value of a node which is operable as an isochronous resource manager may be designated as valid. That is, although each node has the CSR of FIG. 3, only the isochronous resource manager of the bandwidth available register may be designated valid. In other words, only the isochronous resource manager has the bandwidth available register substantially. A maximum value is retained in the bandwidth available register if the bandwidth is not assigned to the isochronous communication, and its value decreases each time the bandwidth is assigned to the isochronous communication.

In the Channels_Available register of offsets 224h to 228h, the respective bits may correspond to channel numbers from 0 to 63, respectively. If the bit is 0, then this may indicate that its channel was already assigned. Only the channels available register of the node which is made operable as the isochronous resource manager may be designated valid.

FIG. 5 illustrates a general ROM format, which may be used for the above-mentioned configuration ROM (located at addresses 200h to 400h of FIG. 3). The node which is the access unit on the IEEE 1394 bus may have a plurality of units which operate independently even while there are using the address space in the node commonly. Unit directories indicate version and position of software relative to this unit. Although positions of a bus information block and a root directory are fixed, positions of other blocks may be designated by offset addresses.

FIG. 6 is a diagram showing in detail the bus information block, the root directory and the unit directory. An ID number indicative of a manufacturer of a device is stored in the Company_ID field within the bus information block. A unique ID peculiar to its device and which does not overlap with other devices may be stored in the Chip_ID field. Also, according to the IEC 61883 standard (which is incorporated herein by reference), 00h may be written in the first octet, A0h may be written in the second octet and 2Dh may be written in the third octet of a unit specification ID (unit_spec_ID) of the unit directory of the device which satisfies the IEC 61883. Further, 01h is written in the first octet of the unit switch version (unit_sw_version), and 1 is written in the LSB (Least Significant Bit) of the third octet.

In order to control the input and output of the device through the interface, the node may have a Plug Control Register (PCR), prescribed in the IEC 61883 standard (which is incorporated herein by reference), in the addresses 900h to 9FFh within the initial unit space of FIG. 3. This register serves to implement the "plug" concept (also called "virtual plug") in order to form a signal path analogous to the analog interface from a logical standpoint. Thus the use of the term "plug" herein does not necessarily imply a physical electrical connection as in the conventional sense. For instance, a first device connected to the IEEE-1394 bus may utilize one channel for communication with a second device, and a second channel for simultaneous communication with a third device, via the same physical connection of the first device to the serial bus. In this case the first device may be said to have two plugs that can each be "connected" to other plugs. When plugs of different devices are said to be "connected" to one another, a data communication channel (s) therebetween is established, thereby enabling the devices to exchange data. In other words, such connections refer to "logical" connections between the respective devices.

Referring to FIG. 7, the PCR includes an oPCR (output Plug Control Register) which contains output plug information, and an iPCR (input Plug Control Register) which contains input plug information. Also, the PCR may include an oMPR (output Master Plug Register) and an iMPR (input Master Plug Register) which contains information of the respective output or input plugs peculiar to each device. Thus, for example, if a device has the capability of simultaneously receiving N input channels of data from N devices, the iMPR of that device should indicate that N input plugs are available. Each device preferably has a single oMPR and/or iMPR, but can include a plurality of oPCRs and iPCRs corresponding to individual plugs, depending upon the capability of the device. The PCR shown in FIG. 7 may, for example, include 31 oPCRs and iPCRs. The flow of isochronous data is controlled by operating the registers corresponding to these plugs.

FIGS. 8(A) to (D) are diagrams showing arrangements of oMPR, oPCR, iMPR and iPCR. FIG. 8(A) shows the arrangement of the oMPR, FIG. 8(B) shows the arrangement of the oPCR, FIG. 8(C) shows the arrangement of the iMPR, and FIG. 8(D) shows the arrangement of the iPCR, respectively. A code indicative of the maximum transmission rate of isochronous data that the device can transmit or receive may be stored in the 2-bit data rate capability of the MSB side of the oMPR and the iMPR. A "broadcast channel base" of oMPR prescribes the channel number used in the broadcast output.

A value indicative of the number of output plugs of the device, i.e. the number of oPCR may be stored in a 5-bit "number of output plugs" field on the LSB side of the oMPR. A value indicative of the number of input plugs of the device, i.e. the number of iPCR may be stored in a 5-bit "number of input plugs" field on the LSB side of the iMPR. A non-persistent extension field and a persistent extension field may be areas defined to make provisions for a future extension.

The "on-line" field of the MSB of the oPCR and the iPCR indicates the manner in which the plug is in use. If this value is 1, for example, this means that the plug is held ON-LINE. If the value is 0, then this indicates the plug is held OFF-LINE. The value of the broadcast connection counter of the oPCR and the iPCR represents the presence (e.g., "1") of the broadcast connection or the absence (0) of the broadcast connection. A value of a 6-bit point-to-point connection counter of the oPCR and the iPCR represents the number of the point-to-point connections of the plug.

The value of a "channel number" field having a 6-bit width of the oPCR and the iPCR may indicate the number of the isochronous channel to which the plug is connected. The value of a 2-bit data rate field of the oPCR may indicate a real transmission rate of a packet of isochronous data outputted from its plug. A code stored in a 4-bit "overhead ID" field of the oPCR may indicate an overhead bandwidth of isochronous communication. The value of a payload field having a 10-bit width of the oPCR may express the maximum value of data contained in the isochronous packets that can be handled by that plug.

Figure 9:
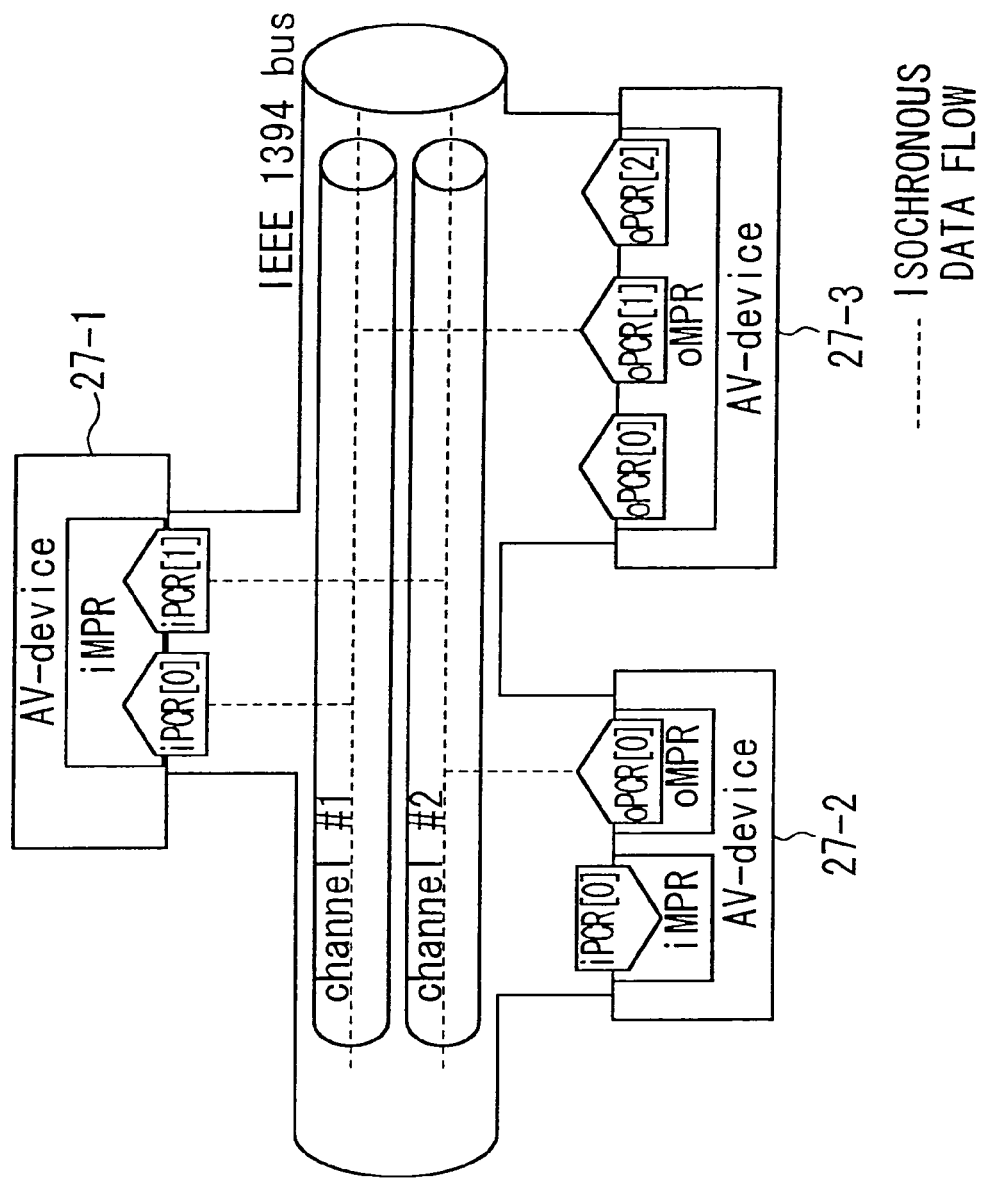
FIG. 9 depicts a relationship among a plug, a PCR and an isochronous channel.

FIG. 9 is a diagram showing a relationship among the plug, the plug control register and the isochronous channel. AV (Audio/Video) devices 27-1 to 27-3 may be connected by an IEEE 1394 bus. (Note that channel #1 and channel #2, while schematically illustrated as separate from one another, do not represent different wires for signal transmission. Rather, they represent different repetitive time slots within which data is transmitted on a common bus.) Of oPCR[0] to oPCR[2] in which the transmission rate and the number of oPCR are prescribed by the oMPR of the AV device 27-3, the isochronous data whose channel was designated by the oPCR[1] may be transmitted on channel #1 of the IEEE 1394 bus. Of the iPCR[0] and the iPCR[1] in which the transmission rate and the number of iPCR were prescribed by the iMPR of the AV device 27-1, according to the iPCR[0] in which the input channel #1 was designated, the AV device 27-1 may read out the isochronous data transmitted on channel #1 of the IEEE 1394 bus. Similarly, the AV device 27-2 may transmit the isochronous data on channel #2 as designated by oPCR[0], and the AV device 27-1 may read out that isochronous data from channel #2 as designated by iPCR[1].

Figure 10:
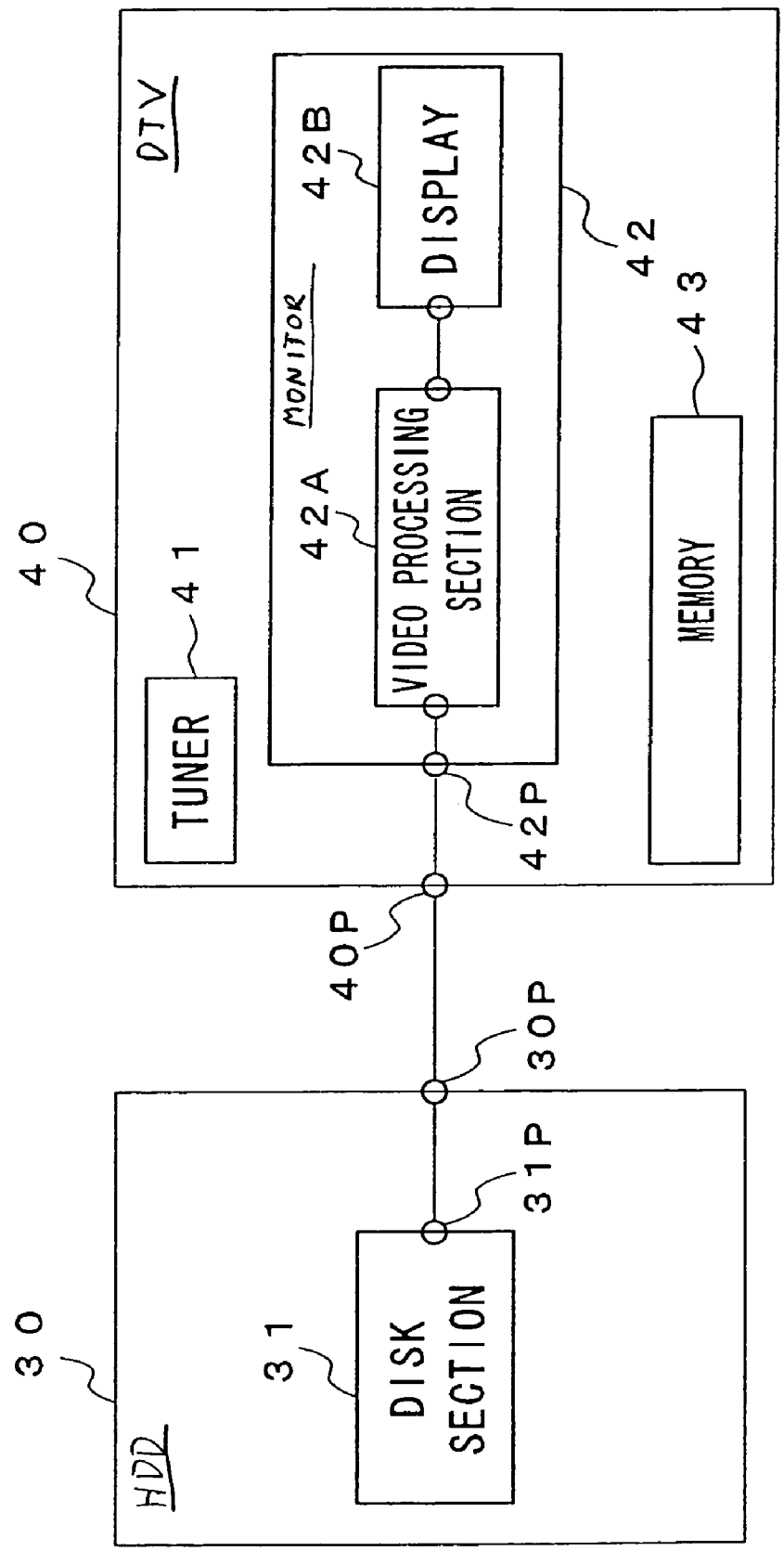
FIG. 10 is a diagram illustrating a connection between a disk section of an HDD and a monitor of a DTV.
Figure 13:
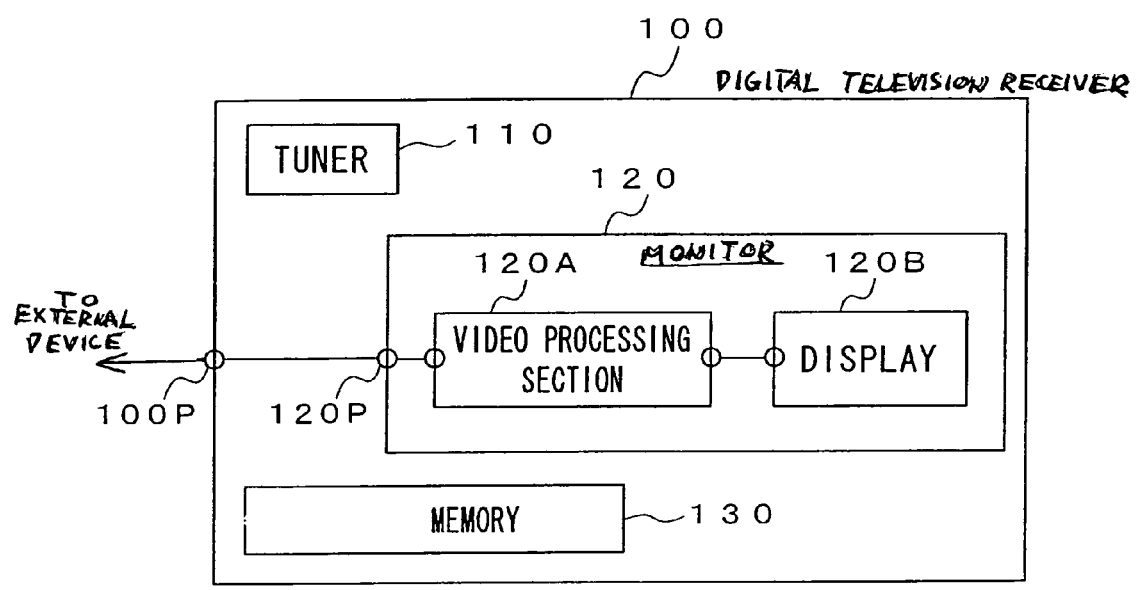
FIG. 13 is a diagram showing an arrangement of a main portion of a digital television receiver.

With reference now to FIG. 10, embodiments of the HDD 30 and DTV 40 of the network system shown in FIG. 1 are depicted. HDD 30 includes a disk section 31 for writing data and reading out data in and from a hard disk (HD) as a subunit. DTV 40 includes a tuner 41 and a monitor 42 as subunits. Further, monitor 42 includes a video processing section 42A for effecting signal processing such as adjustment of brightness and adjustment of chromaticity on input video data and a display 42B for displaying an image based on video data signal-processed by this video processing section 42A as functional blocks. The display 42B is considered a functional block operative as a terminating device. In particular, display 42B "terminates" or "consumes" input video data by transforming the data to an image signal (typically with a D/A converter) and displaying the corresponding images on a display screen. Display 42B may also include processing circuitry for further processing the data supplied thereto prior to converting the same to an analog signal.

An important aspect of the presently described embodiment resides in the provision within DTV 40 of a memory 43 as shown in FIG. 10. Information pertaining to the above-mentioned subunits existing within DTV 40 are stored in memory 43. When video data reproduced by the video section 31 of HDD 30 is transmitted to monitor 42 of DTV 40 in the isochronous transmission fashion and the image based on such video data is displayed on display 42B, the following connection settings will be executed:

Initially, a plug 31P of disk section 31 of HDD 30 and a plug 30P of HDD 30 are connected together. Similarly, a plug 42P of the monitor 42 of the DTV 40 and a plug 40P of the DTV 40 may be connected together. The plugs 30P, 40P are plugs that are used to transmit data in the isochronous transmission fashion. The plugs shown in FIG. 10 such as 30P, 40P, etc. are typically embodied as input/output (I/O) interfaces each having one or more registers and control electronics. As mentioned earlier, when plugs are said to be "connected" together, a communication channel or channels is established therebetween to enable data communication to take place.

Next, plug 30P of HDD 30 and plug 40P of DTV 40 may be connected together. This connection may be executed according to the IEC 61883-1 standard. The flowchart of FIG. 11 depicts a procedure for implementing this connection setting.

In step S31, a first node (hereinafter referred to as "CNM node") that is being operated as a connection manager, e.g. IRD 20 may issue an isochronous communication channel get request to a second node (hereinafter referred to as "IRM node") that is being operated as an isochronous resource manger (IRM), e.g. PC 50. The IRM node may set 0 to the bit corresponding to the vacant channel of the CSR channel available register. Subsequently, in step S32, the CNM mode issues an isochronous communication necessary bandwidth get request to the IRM node. In response to this request, the IRM node may subtract a numerical value corresponding to the requested bandwidth from the value of the CSR bandwidth available register.

Next, in step S33, the CNM node selects an unused plug control register (iPCR [j]) from its iPCR relative to the DTV 40; sets an available isochronous channel number (channel number obtained at the step S31) to its channel number; and sets the value "1" to its point-to-point counter. In step S34, the CNM mode then selects an unused PCR (i.e., oPCR [k]) from its oPCR relative to the HDD 30; sets the same isochronous channel number as that set to the iPCR [j]; and sets 1 to its point-to-point counter.

Accordingly, as just described, the channel, bandwidth, output plug and input plug are maintained so that the connection setting processing is finalized. Thereafter, the disk section 31 of HDD 30 may start reading out video data from the hard disk, and this video data may be transmitted from plug 30P of HDD 30 to plug 40P of the DTV 40 by using the channel and bandwidth thus maintained in the isochronous transmission fashion. Thus, the display 42B of the monitor 42 may display an image based on such video data.

As described above, the DTV 40 includes memory 43 in which information concerning the subunits is stored. In the illustrative embodiment, information pertaining to display 42B serving as the terminating device, as well as information pertaining to video processing section 42A, is stored in the descriptor having monitor 42 information stored in memory 43.

FIG. 12 depicts an illustrative descriptor containing the monitor 42 information. The descriptor of memory 43 may contain the following fields:

"Subunit_dependent_length=33 bytes"—indicates that the entire length of the descriptor is 33 bytes.

"Datastructure_Type=Monitor subunit dependent information"—indicates the field type of the descriptor, and may indicate the descriptor having the information of the monitor subunit.

"Audio_subunit_version=FF (hex)"—indicates the version of the audio subunit standard.

"Monitor_subunit_version=10 (hex)"—indicates the version of the monitor subunit standard.

"Number_of_configuration_dependent_information=1"—indicates that the information for one configuration is included.

"Configuration_dependent_length=26 bytes"—indicates that the length of the descriptor of the following configuration information is 26 bytes.

"Datastructure_type=Configuration_information"—indicates the field type of this descriptor, and may indicate the descriptor having the configuration information.

"Config_ID=1"—indicates the configuration number.

"Master_cluster_information"—indicates the cluster information.

"Number_of-source_plug=0"—indicates that the number of the source (output) plug of the subunit is 0.

"Number_of_fb_dependent_information=2"—indicates that the number of functional blocks existing within the subunit is two.

"fb_dependent_length=10 bytes"—indicates that the length of the descriptor of the following functional block information is 10 bytes.

"Datastructure_type=FB_dependent_information"—indicates the field type of this descriptor, and may indicate the descriptor having the functional block information.

"fb_type=video-feature"—indicates that the type of the functional block is the video processing section (video feature).

"fb_ID=1"—indicates the functional block number.

"fb_name=FF"—indicates the functional block name.

"Number_of_destination_plug=1"—indicates that the number of destination (input) plugs of the functional block is one.

"Source_ID (1)=subunit destination plug 1"—indicates that the source to which the input plug is connected is the input plug 1 of the subunit.

"cluster_information=same as up stream"—represents the cluster information.

"fb_dependent_length=10 bytes"—indicates that the length of the descriptor of the following functional block is 10 bytes.

"Datastructure_type=FB_dependent_information"—indicates the field type of the descriptor, and may indicate the descriptor having the functional block information.

"fb_type=display"—indicates that the type of the functional block is the display.

"fb_ID=2"—indicates the functional block number.

"fb_name=FF"—the functional block name.

"Number_of_destination_plug=1"—indicates that the number of the destination (input) plug of the functional block is 1.

"Source_ID (1)=fb_type; video_feature, fb_ID; 1"—indicates that the source to which the input plug is connected is the video processing section having the functional block number 1.

"cluster_information=none"—represents the cluster information (none in this example).

As set forth above, in an illustrative embodiment of the invention, a serial bus connected electronic device (DTV 40 in this example) includes a subunit (e.g., monitor 42) and a memory 43 which stores information pertaining to the subunit. The subunit includes at least one functional block (in this example, display 42B) that is also a terminating device for terminating input data applied to DTV 40. Memory 43 stores information, and in particular, connection state or "virtual plug" information, pertaining to display 42B, as well as similar information pertaining to one or more other functional blocks as video processing section 42A. Therefore, when another node connected by the IEEE 1394 bus 10, e.g. PC 50 or the like, accesses the corresponding descriptor, that node can readily obtain the connected state of display 42B serving as the termination device. As a result, operations of the node accessing the connected state information are enhanced. For instance, the node accessing this information may be designed to make control decisions based on the obtained connection state information.

It is noted that while in the above-described embodiment, the terminating device is typified by display 42B, other devices can be alternatively or additionally be employed. For instance, a printer that displays an image corresponding to inputted image data may be utilized as a terminating device. As another example, when the input data is audio data, the terminating device may be an audio output means such as a speaker. Moreover, the invention is also contemplated for use in other devices aside from a DTV.

From the foregoing, an electronic device in accordance with the invention includes a subunit having a functional block terminating device for transforming and terminating input data, as well as a memory for storing information pertaining to the functional block. Thus an external electronic apparatus, e.g. a controller, can readily obtain connection state information of the terminating device, thereby facilitating operations with the electronic device.

While the present invention has been described above in reference to preferred embodiments thereof, it is understood that these embodiments are merely exemplary and that one skilled in the art can make many changes to the disclosed embodiments without departing from the spirit and scope of the invention as defined by the appended claims.

What is claimed is:

1. An electronic apparatus for processing audio/video data, comprising:
   a data processing subunit, included within said electronic apparatus, for receiving and processing audio/video input data;
   a first functional block, included within said data processing subunit, operative as an audio/visual processing functional block to process the audio/visual input data;
   a second functional block, included within said data processing subunit, operative as a terminating functional block to terminate the data processed by said first functional block by transforming the audio/visual data into a user-visible signal and outputting said user-visible signal being not processed afterward;
   a memory for storing information pertaining to said data processing subunit and said second functional block, wherein the information stored in said memory is accessible by an external electronic apparatus connected to said electronic apparatus via a serial data bus; and
   connection means for connecting said electronic apparatus and said external electronic apparatus via said serial data bus,
   wherein said information pertaining to said first and second functional blocks stored within said memory includes information indicative of specific capabilities of said first and second functional blocks and virtual plug information of said first and second functional blocks and the virtual plug information of said second functional block contains information indicating that the input plug of said second functional block is connected to said first functional block.

2. The electronic apparatus of claim 1 wherein the information stored in said memory indicates that said second functional block terminates data received by the data processing subunit.

3. The electronic apparatus of claim 1 wherein said memory has a hierarchical structure.

4. The electronic apparatus of claim 1 wherein said data is video data and said second functional block is a video display means that terminates said video data by converting the processed data into a video signal and displaying video corresponding thereto.

5. The electronic apparatus of claim 4 wherein said video display means is a display.

6. The electronic apparatus of claim 4 wherein said video display means is a printer.

7. The electronic apparatus of claim 1 wherein said data is audio data and said second functional block is an audio output means that terminates said audio data by converting it into sound corresponding thereto.

8. The electronic apparatus of claim 1 wherein said serial data bus performs data communication in accordance with the IEEE-1394 standard.

9. The electronic apparatus of claim 1 wherein said electronic apparatus is a digital television receiver.

10. A method for processing data, comprising:
   receiving input audio/video data at a data processing subunit included within an electronic apparatus and processing the received input audio/video data at a first functional block within said data processing subunit included within said electronic apparatus, wherein said audio/video input data is received by said electronic apparatus over a serial bus;
   terminating said processed data with a second functional block included within said subunit by transforming the audio/visual data into a user-visible signal and outputting said user-visible signal not processed afterward; and
   storing information pertaining to said data processing subunit and said second functional block in a memory,
   wherein the information stored in said memory is accessible by an external electronic apparatus connected to said electronic apparatus via said serial data bus, and
   wherein said information pertaining to said first and second functional blocks stored within said memory includes information indicative of specific capabilities of said first and second functional blocks and virtual plug information of said first and second functional blocks and the virtual plug information of said second functional block contains information indicating that the input plug of said second functional block is connected to said first functional block.

11. The method of claim 10 wherein the information stored in said memory indicates that said second functional block terminates data received by said data processing subunit.

12. A system having a plurality of electronic apparatuses connected via a serial data bus to enable transmission of data among said apparatuses, comprising:
   a data transmitting apparatus for transmitting audio/video data over said serial data bus;
   a data receiving apparatus for receiving the audio/video data transmitted by said serial data transmitting apparatus over said data bus;
   wherein said data receiving apparatus comprises:
   a data processing subunit, included within said receiving apparatus, for processing said received audio/video data;
   a first functional block, included within said data processing subunit, operative as an audio/visual processing functional block to process the audio/visual input data;
   a second functional block, included within said data processing subunit, operative as a terminating functional block to terminate the data processed by said first functional block by transforming the audio/visual data into a user-visible signal and outputting said user-visible signal being not processed afterward; and a memory for storing information pertaining to said data processing subunit and said second functional block, wherein the information stored in said memory is accessible by an external electronic apparatus connected to said electronic apparatus via said serial data bus, wherein said information pertaining to said first and second functional blocks stored within said memory includes information indicative of specific capabilities of said first and second functional blocks and virtual plug information of said first and second functional blocks and the virtual plug information of said second functional block contains information indicating that the input plug of said second functional block is connected to said first functional block.

13. The system of claim 12 wherein the information stored in said memory indicates that said second functional block terminates data received by said data processing subunit.

14. A data processing method for processing data in a system having a plurality of electronic apparatuses connected via a serial data bus, comprising the steps of:

transmitting audio/video data from a transmitting apparatus to a receiving apparatus of said plurality of apparatuses;

receiving the audio/video data at a data processing subunit included within said receiving apparatus;

processing the audio/video data received by said data processing subunit in a first functional block included within said data processing subunit;

terminating said processed data with a second functional block included within said subunit by transforming the audio/visual data into a user-visible signal and outputting said user visible signal not processed afterward; and storing information pertaining to said data processing subunit and said second functional block in a memory, wherein the information stored in said memory is accessible by an external electronic apparatus connected to said electronic apparatus via said serial data bus, wherein said information pertaining to said first and second functional blocks stored within said memory includes information indicative of specific capabilities of said first and second functional blocks and virtual plug information of said first and second functional blocks and the virtual plug information of said second functional block contains information indicating that the input plug of said second functional block is connected to said first functional block.

* * * * *